United States Patent [19]

Kemmerer

[11] Patent Number: 5,302,273
[45] Date of Patent: Apr. 12, 1994

[54] INDUCED IONIC REACTION DEVICE WITH RADIAL FLOW

[76] Inventor: Terry L. Kemmerer, 1835 W. Union, Unit 5, Englewood, Colo. 80110

[21] Appl. No.: 15,376

[22] Filed: Feb. 8, 1993

[51] Int. Cl.⁵ ............................................. B03C 9/00
[52] U.S. Cl. ..................................................... 204/305
[58] Field of Search ............... 204/272, 275, 267–269, 204/302–308

[56] References Cited

U.S. PATENT DOCUMENTS

| | | | |
|---|---|---|---|
| 3,324,026 | 6/1967 | Waterman et al. | 204/305 X |
| 3,728,245 | 4/1973 | Preis et al. | 204/275 |
| 3,926,754 | 12/1975 | Lee | 204/152 |
| 4,048,047 | 9/1977 | Beck et al. | 204/275 X |
| 4,049,545 | 9/1977 | Horvath | 210/28 |
| 4,156,646 | 5/1979 | Schulz | 210/28 |
| 4,189,381 | 2/1980 | Laferty | 210/28 |
| 4,263,147 | 4/1981 | Robinson | 210/685 |
| 4,293,400 | 10/1981 | Liggett | 204/302 |
| 4,367,127 | 1/1983 | Messing et al. | 204/272 X |
| 4,378,276 | 3/1983 | Liggett et al. | 204/149 |
| 4,477,355 | 10/1984 | Liberti | 210/665 |
| 4,482,459 | 11/1984 | Shiver | 210/639 |
| 4,599,221 | 7/1986 | Ketzinel et al. | 423/7 |
| 4,695,386 | 9/1987 | Berry | 210/665 |
| 4,710,282 | 12/1987 | Chak et al. | 204/272 X |
| 4,872,959 | 10/1989 | Herbst et al. | 204/109 |
| 5,098,572 | 3/1992 | Faup et al. | 210/605 |
| 5,104,545 | 4/1992 | Means et al. | 210/650 |

*Primary Examiner*—Donald R. Valentine
*Attorney, Agent, or Firm*—John R. Flanagan

[57] ABSTRACT

An induced ionic reaction device includes an elongated hollow transport tube having an elongated chamber having a central longitudinal axis and an inlet and outlet in opposite end portions of the transport tube for entry of fluid to be treated into the chamber of the transport tube and for exit of fluid treated from the chamber of the transport tube, a plurality of center-flow and peripheral-flow disc-shaped elements stationarily disposed in the chamber of the transport tube and being spaced from one another along the longitudinal axis of the chamber of the transport tube, the disc-shaped elements and the hollow transport tube defining a radial path of fluid flow through the chamber of the transport tube, and an electrical control connected to the disc-shaped elements for electrically charging preselected ones of the disc-shaped elements to induce ionic reactions in the fluid flowing through the chamber of the transport tube and thereby precipitate out substances carried by the fluid into large complex molecular clumps.

35 Claims, 4 Drawing Sheets

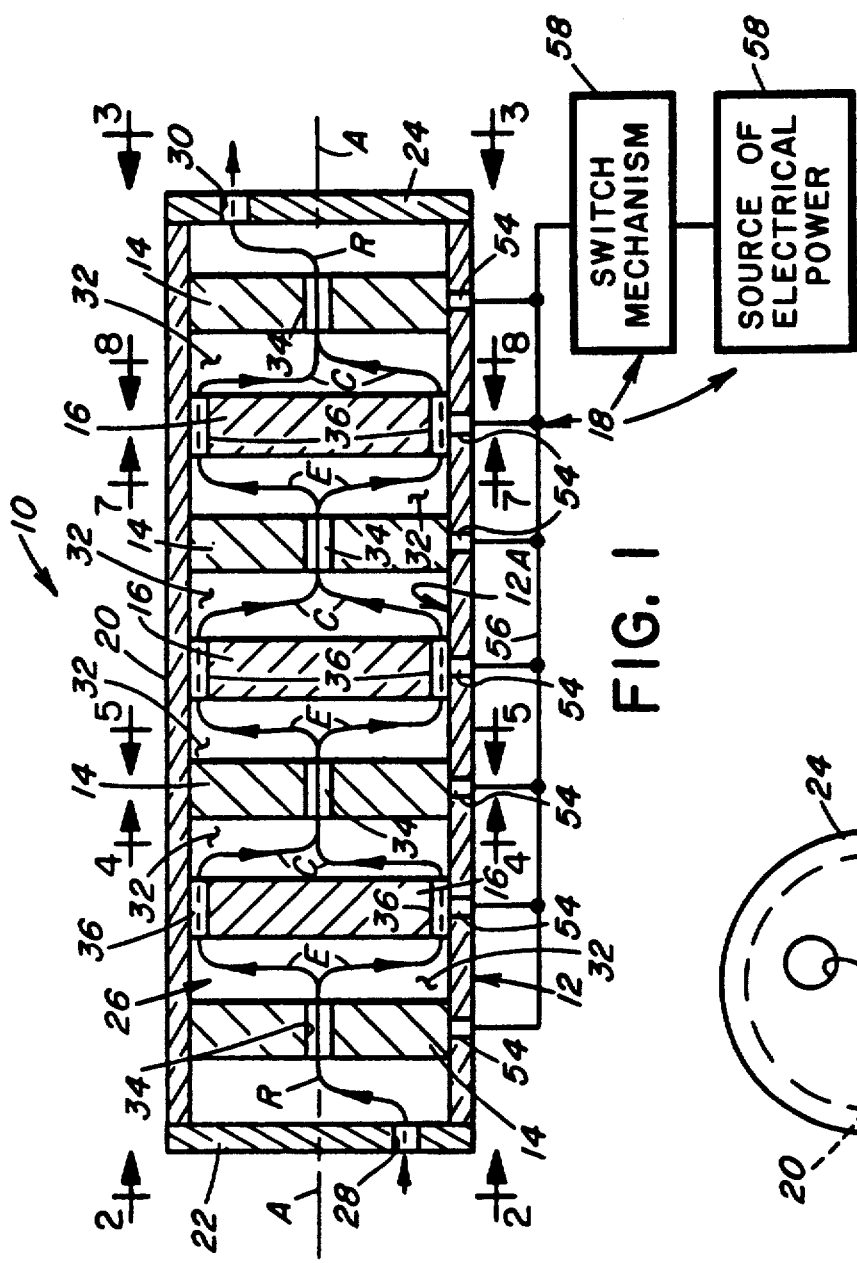

INDUCED IONIC REACTION DEVICE WITH RADIAL FLOW

BACKGROUND OF THE INVENTION

1. Field of the Invention

The present invention generally relates to techniques for removal of contaminants dissolved in a fluid, such as water, and, more particularly, is concerned with an induced ionic reaction device for producing a radial flow of fluid through a chamber of the ion reaction device to cause precipitation of contaminants dissolved in fluids, such as water.

2. Description of the Prior Art

The development of an effective method for floculating contaminants in waste waters and liquids by creating insoluble compounds or complexes and then precipitating them so as to make them easily filterable subsequently is a highly desired objective. Prior art methods in the electrochemical field, and specifically ones which take the electrocoagulative approach, have sought to achieve these effects.

However, these prior art methods are inefficient in both treatment and cost because, in the perception of the inventors herein, of preconceived assumptions and misunderstandings of the true nature and actions of the laws of chemistry, physics, and basic electricity theory when applied to the realm of the contaminated liquid medium. Each of these sciences adheres strictly to its own model of the universe. Such adherence to purity of scientific viewpoint often leaves wide cracks between the sciences and results in an inability to adequately conceptualize the processes occurring in contaminated liquid mediums.

As a result of these preconceived assumptions and misunderstandings, linear flow designs have been developed which result in low turbulence, low exposure or incorrect exposure to electric field flow and frequency proximity, and lack of proper agitation and mixing of the liquid. Instead, these linear flow designs have created counter productive clogging, resistant foaming actions, and unnecessary rises in temperature and excessive energy expenditures, all of which, further hamper the desired level of contaminant precipitate and result in the necessity to back flush the devices. This also seems to have caused the future corrective research and design evolutionary path of these devices to stray further from peak efficiency and validity. In other words, the designs themselves become self-defeating.

Also, spiral flow designs have been developed which actually sacrifice much of the potential and true and actual treatment area due to the need to transport the liquid and achieve the spiral flow prescribed in these designs. Where a large percentage of the potential electrode surface is exposed to the liquid, it is not possible to achieve the maximum effect needed to accomplish the intended purpose of the devices because the design itself cuts down the actual exposure of the liquid to treatment. Furthermore, worse still, water likes to flow in a spiral path. The spinning of the earth promotes a certain amount of spiral movement. The mere spiral movement of water does not cause any mixing to take place whatsoever. Therefore, producing a spiral flow effect by itself is a waste of effort.

Consequently, a need still exists for an effective technique for floculating contaminants in waste water and liquids.

SUMMARY OF THE INVENTION

The present invention provides an induced ionic reaction device designed to satisfy the aforementioned need. The ionic reaction device of the present invention achieves floculating of contaminants in waste waters and liquids by creating insoluble compounds or complexes and then precipitating them so as to make them easily filterable subsequently. The present invention operates on and effectively treats, but is not limited to, hazardous wastewaters, non-hazardous wastewaters, process wastewaters, waters containing heavy metals, waters possessing bacteria and viruses, waters containing dissolved solids and suspended solids, and waters containing oil and grease or other emulsions. Also, the present invention sterilizes biologically hazardous or infested liquids and precipitates many dissolved radioactives from water or liquids. These liquid wastes are produced by our gobal society as a necessary by-product of manufactured goods and service activities.

Accordingly, the present invention is directed to an induced ionic reaction device which comprises: (a) an elongated hollow transport tube having an elongated chamber with a longitudinal axis and an inlet and an outlet in opposite end portions of the transport tube for entry of fluid to be treated into the chamber of the transport tube and for exit of fluid treated from the chamber of the transport tube; (b) means disposed in the chamber of the transport tube for defining a radial path of fluid flow through the chamber of the transport tube; and (c) control means connected to the radial path defining means for imposing a predetermined electron field in the chamber of the transport tube to induce ionic reactions in the fluid flowing through the chamber of the transport tube and thereby precipitate out substances carried by the fluid into large complex molecular clumps.

More particularly, the means for defining a radial path of fluid flow through the chamber of the transport tube are a plurality of disc-shaped elements. The disc-shaped elements are stationarily disposed in the chamber of the transport tube and spaced from one another along the longitudinal axis of the chamber of the transport tube. The disc-shaped elements and an interior surface of the hollow transport tube together define the radial path of fluid flow through the chamber of the transport tube.

A first group of the disc-shaped elements are center-flow elements sealed about their peripheral edges with the interior surface of the transport tube. Each of the disc-shaped elements in the first group has a flow passage through approximately a central portion of the center-flow element. A second group of the disc-shaped elements are peripheral-flow elements. Each of the disc-shaped elements of the second group has a plurality of flow passages through approximately the peripheral portion of the peripheral-flow element. The peripheral-flow disc-shaped elements of the second group are located in alternating relation with the center-flow disc-shaped elements of the first group.

The radial path of fluid flow through the chamber of the transport tube, as defined by the disc-shaped elements of the first and second groups together with the interior surface of the transport tube, has alternating expanding and contracting path segments. In the expanding path segments, the flow is directed radially outwardly from the central flow passages of the disc-shaped elements of the first plurality toward the peripheral passages of the disc-shaped elements of the second plurality. In the contracting path segments, which interconnect the expanding path segments, the flow is directed radially inwardly from the peripheral passages of the disc-shaped elements of the second plurality toward the central flow passages of the disc-shaped elements of the first plurality. The flow of fluid proceeds along the radially-outwardly directed expanding path segments at a slower speed than along the radially-inwardly directed contracting path segments.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a longitudinal axial sectional view of an induced ionic reaction device of the present invention, showing a transport tube and a plurality of center-flow and peripheral-flow disc-shaped elements of a first configuration disposed in the transport tube.

FIG. 2 is a front end view of the device as seen along line 2—2 of FIG. 1.

FIG. 3 is a rear end view of the device as seen along line 3—3 of FIG. 1.

DETAILED DESCRIPTION OF THE INVENTION

Figure 12:
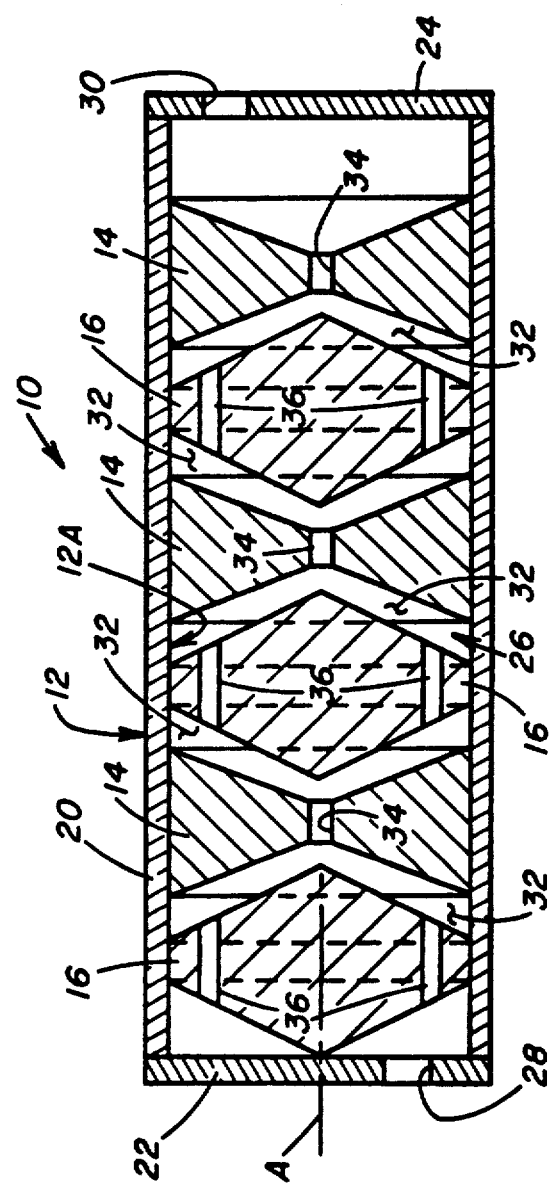
FIG. 12 is a longitudinal axial sectional view of an induced ionic reaction device of the present invention, showing a transport tube and a plurality of center-flow and peripheral-flow disc-shaped elements of a second configuration disposed in the transport tube.

Referring to the drawings and particularly to FIGS. 1 and 12, there is illustrated an ionic reaction device, generally designated 10, of the present invention. The ionic reaction device 10 basically includes an elongated hollow transport tube 12, a plurality of center-flow and peripheral-flow disc-shaped elements 14, 16, and an electrical control means 18 for imposing a predetermined electron field in the transport tube 12.

Referring to FIGS. 1-3 and 12, the transport tube 12 of the ionic reaction device 10 has an elongated rigid cylindrical wall 20 and a pair of planar rigid front and rear end plates or walls 22, 24 suitably fitted and attached, such as by threaded connections, to the open opposite ends of the cylindrical wall 20. The cylindrical wall 20 and the front and rear end walls 22, 24 together define an elongated enclosed internal chamber 26 which has a central longitudinal axis A. The transport tube 12 also has an inlet port 28 defined through the front end wall 22 and an outlet port 30 defined through the rear end wall 24. The inlet port 28 permits the entry of a flow of fluid to be treated into the chamber 26, and the outlet port 30 permits the exit of the flow of fluid after treatment from the chamber 26. Typically, flow tubes or pipes (not shown) are threaded into the inlet and outlet portions 28, 30 for supplying and removing the fluid flow to and from the transport tube 12. The transport tube 12 can be constructed of a suitable metallic material, but is preferably constructed of a suitable non-metallic, electrically non-conductive, material.

As shown in FIGS. 1 and 12, the center-flow and peripheral-flow disc-shaped elements 14, 16 of the ionic reaction device 10 are stationarily disposed in the chamber 26 of the transport tube 12 and are spaced from one another along the longitudinal axis A of the transport tube 12 so as to define respective gaps 32 between the elements 14, 16 such that the elements 14, 16 do not directly contact one another. The peripheral-flow disc-shaped elements 16 are located in alternating relation with the center-flow disc-shaped elements 14. The center-flow elements 14 constitute a first group of the disc-shaped elements, while the peripheral-flow disc-shaped elements 16 constitute a second group of the elements. The center-flow and peripheral-flow elements 14, 16 are preferably made of suitable electrically conductive materials.

Figure 4:
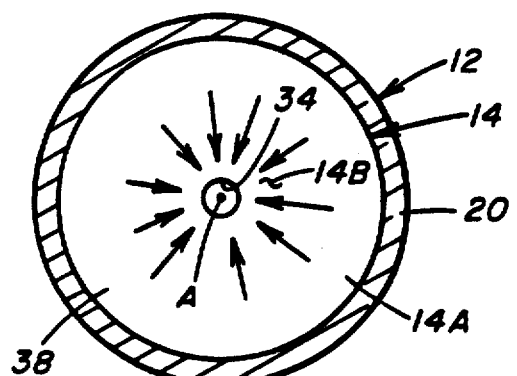
FIG. 4 is an enlarged front end elevational view of one of the center-flow disc-shaped elements as seen along line 4—4 of FIG. 1, showing also the transport tube in cross-section.
Figure 6:
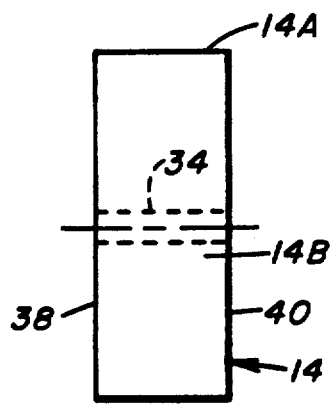
FIG. 6 is an enlarged side elevational view of the center-flow disc-shaped element of FIGS. 4 and 5.
Figure 5:
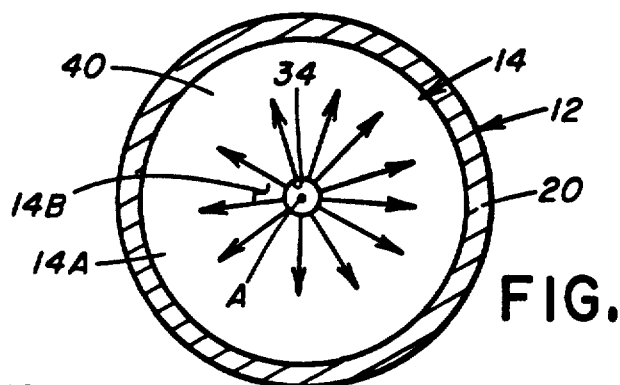
FIG. 5 is an enlarged rear end elevational view of the same one of center-flow disc-shaped elements as seen along line 5—5 of FIG. 1.
Figure 7:
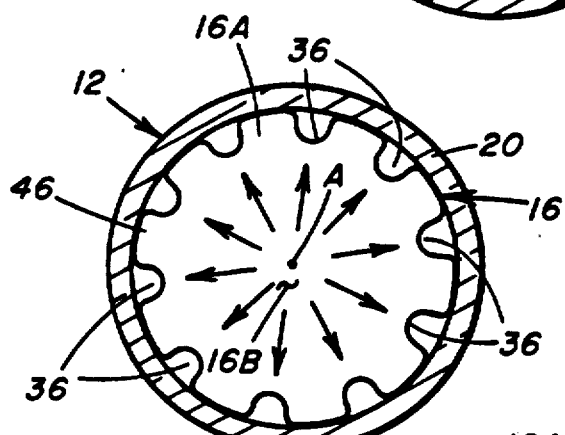
FIG. 7 is an enlarged front end elevational view of one of the peripheral-flow disc-shaped elements as seen along line 7—7 of FIG. 1, showing also the transport tube in cross-section.
Figure 9:
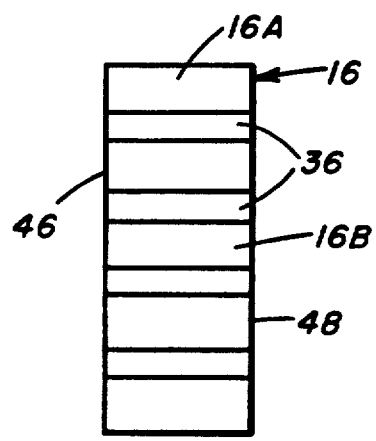
FIG. 9 is an enlarged side elevational view of the peripheral-flow disc-shaped element of FIGS. 7 and 8.
Figure 8:
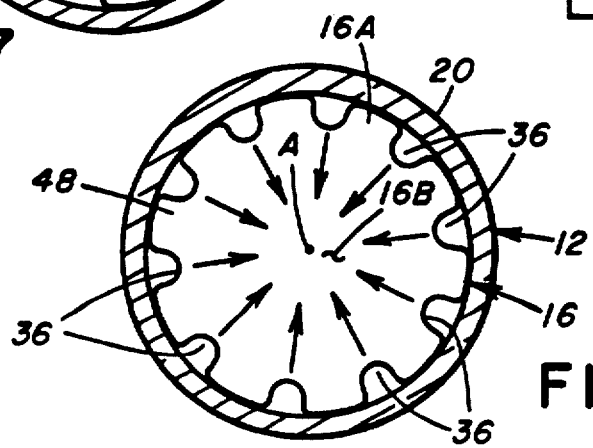
FIG. 8 is an enlarged rear end elevational view of the same one of peripheral-flow disc-shaped elements as seen along line 8—8 of FIG. 1.

As seen in FIGS. 1-3, each of the center-flow elements 14 of the first group is sealed about its peripheral edge portion 14A with a cylindrical interior surface 12A of the transport tube 12 such that no fluid can flow past the center-flow elements 14 between the peripheral edge portions 14A thereof and the interior surface 12A of the transport tube 12. Also, each of the center-flow elements 14 has a flow passage 34 through approximately a central portion 14B of the center-flow element 14, permitting fluid to flow through the center-flow elements 14 solely via the central flow passage 34. As seen in FIGS. 1, 7 and 8, each of the peripheral-flow elements 16 of the second group has a plurality of flow passages 36 through approximately the peripheral portion 16A of the peripheral-flow element 16. Peripheral segments of the peripheral-flow elements 16 between the peripheral flow passages 36 engage the interior surface 12A of the transport tube 12. As depicted by the arrows in FIGS. 1, 3, 4, 7 and 8, the center-flow and peripheral-flow disc-shaped elements 14, 16 and the hollow transport tube 12 together define an overall radial path R of fluid flow through the chamber 26 of the transport tube 12, the flow proceeding through the central flow passages 34 of the center-flow elements 14, through the gaps 32 between the alternating center-flow and peripheral-flow elements 14, 16, and through the peripheral passages 36 of the peripheral-flow elements 16.

The radial path R of fluid flow through the chamber 26 of the transport tube 12 has alternating expanding and contracting flow path segments E, C. Along the expanding path segments E, the expanding flow is directed radially outwardly from the central flow passages 34 of the center-flow elements 14 toward the peripheral flow passages 36 of the peripheral-flow elements 16. Along the contracting path segments C, which interconnect the expanding path segments E, the contracting flow is directed radially inwardly from the peripheral passages 36 of the peripheral-flow elements 16 toward the central flow passages 34 of the center-flow elements 14. The speed of fluid flow along the radially-outwardly directed expanding path segments E increases, while the speed of fluid flow along the radially-inwardly directed contracting path segments C decreases. Thus, the speed of fluid flow along expanding path segments E is faster than the speed of fluid flow along contracting path segments C. The expanding and contracting radial path of fluid flow results in constant changes the fluids pressure, density, speed, velocity, direction, temperature, liquid mix, turbulence and exposure to treatment.

Several different configurations of the center-flow and peripheral-flow disc-shaped elements 14, 16 are disclosed. Regardless of respective configurations, the center-flow elements 14 always block the flow of fluid at or near their peripheries past the elements 14 and adjacent to the interior surface 12A of the transport tube 12 and thereby redirect the flow radially inwardly toward the central portion 14A thereof. Regardless of respective configurations, the peripheral-flow elements 16 always block the flow of fluid through the elements 16 at or near central portions 16B of the elements 16 and thereby redirect the flow radially outwardly toward the peripheral portion 16A thereof.

Figure 13:
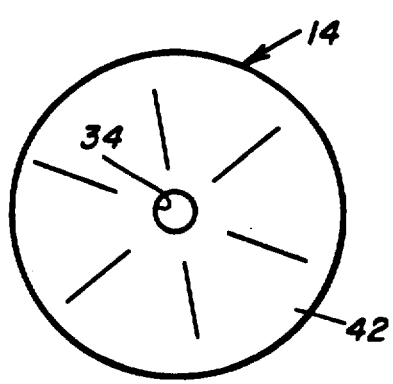
FIG. 13 is an enlarged end elevational view of one of the center-flow disc-shaped elements of the second configuration of FIG. 12.
Figure 14:
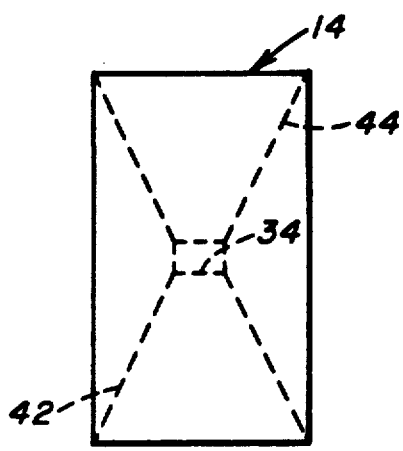
FIG. 14 is an enlarged side elevational view of the center-flow disc-shaped element of FIG. 13.

In the first configuration shown in FIGS. 1 and 4-6, each of center-flow disc-shaped elements 14 of the first group has an exterior cylindrical shape and a pair of parallel face surfaces 38, 40 defined on the opposite ends of the center-flow element 14. In the second configuration shown in FIGS. 12-14, each of the center-flow disc-shaped elements 14 of the first group has an exterior cylindrical shape and a pair of conical concave face surfaces 42, 44 defined on the opposite ends of the center-flow element 14.

Figure 10:
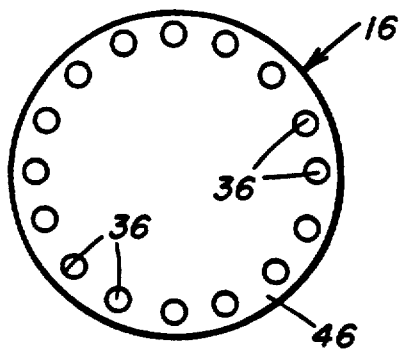
FIG. 10 is an end elevational view of a peripheral-flow disc-shaped element having a configuration slightly modified from that of the element of FIGS. 7 and 8.
Figure 11:
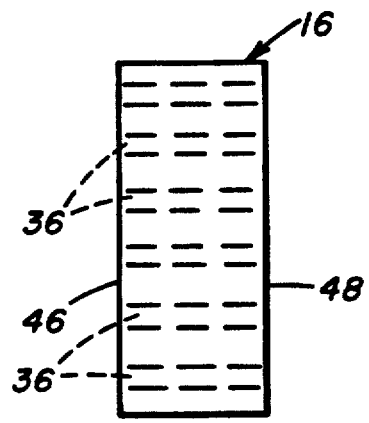
FIG. 11 is a side elevational view of the peripheral-flow disc-shaped element of FIG. 10.
Figure 15:
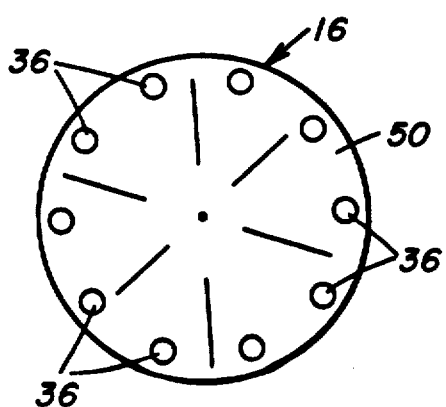
FIG. 15 is an enlarged end elevational view of one of the peripheral-flow disc-shaped elements of a third configuration of FIG. 12.
Figure 16:
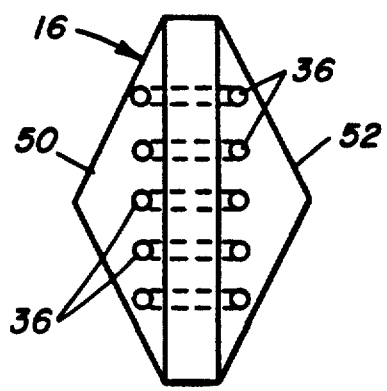
FIG. 16 is an enlarged side elevational view of the peripheral-flow disc-shaped element of FIG. 15.

In a first configuration shown in FIGS. 1 and 7-9, each of the peripheral-flow disc-shaped elements 16 of the second group has an exterior cylindrical shape and a pair of parallel face surfaces 46, 48 defined on the opposite ends of the peripheral-flow element 16. The peripheral flow passages 36 are in the form of semi-cylindrical grooves made in the peripheral portion 16A of the peripheral-flow element 16 which merge with the interior surface 12A of the transport tube 12. In a modification of the first configuration shown in FIGS. 10 and 11, the peripheral flow passages 38 are in the form of cylindrical holes made through the peripheral portion 16A of each peripheral-flow element 16 in spaced relation from the interior surface 12A of the transport tube 12. In a second configuration shown in FIGS. 12, 15 and 16, each of the peripheral-flow elements 16 has an exterior cylindrical shape and a pair of conical convex face surfaces 50, 52 defined on opposite ends of the peripheral-flow element 16. Other shapes besides conical are possible. Also, either spiral grooves or guide planes can be etched or attached to the face surfaces of the elements 14, 16 to achieve a further spiraling action in the flow of fluid which adds to the other dynamic actions occurring therein as described above.

The electrical control means 18 of the device 10 includes electrical contacts 54 spaced axially along and being fixed into and extending through the cylindrical wall 20 of the transport tube 12 so as to make contact with the respective center-flow and peripheral-flow disc-shaped elements 14, 16 within transport tube 12. The control means 18 also includes conductors 56 connecting the various electrical contacts 54 to a switch mechanism 56 and a source of electrical power 58, either AC or DC, connected to the switch mechanism 56. The switch mechanism 56 can be manually set or automatically set by computer control to supply predetermined electrical charges or pulses to the preselected ones of the disc-shaped elements 14, 16 so that the elements will act as either electrical electrodes or emitters in order to induce ionic reactions in the fluid flowing through the chamber 26 of the transport tube 12 and thereby precipitate out substances, being carried by the flow of fluid along the radial path R through the transport tube 12, into large complex molecular clumps.

The operation of the ionic reaction device 10 of the present invention can be understood with reference to a particular application, such as upon wastewater containing dissolved metals. The dissolved metals in wastewater are held as ions, often as metal associated with hydroxides or phosphates depending on the source. The inflowing stream of water bound with dissolved metals enters the reaction chamber 26 through the inlet port 28 and the water bonds are instantly disrupted and continue to be disrupted throughout the following process. Often selected metal ion seeds are made available and other already present materials and substances in the wastewater also become available which combine with the freed target metals to form or begin to form insoluble complexes. Oxygen and hydrogen ions are also available to replace the water receptor sites in the newly forming complexes. For example, oxygen ions are extremely reactive and they quickly react with the available metal ions to produce metal oxides. Metal oxides are usually completely insoluble. Consequently, these newly formed metal oxides begin to precipitate out of the solution immediately. The precipitates can then be filtered after exiting the tube 12 by the applicable method best suited to the collection characteristics of the floc. An interesting consequence and added bonus of this process is that as the hydroxide ion is reduced to water, the pH of the resulting water stream is often moved toward neutral.

From the above description, it can be realized that the radial flow of a fluid through an electron field and/or a specifically set frequency via an emitter is a more efficient and effective way to achieve induced ionic reactions within some fluids. An electro-chemical action is produced which enhances, effects, supports, or starts an ionic reaction or free radical reaction in various effluent streams. The consequence of this ionic binding produces, in most cases, a stable fallout of matter which in many cases may pass the EPA's Toxicity Characteristic Leaching Procedure (TCLP) which means that if the matter meets TCLP requirements it may then be de-listed and thus not be considered a toxic or hazardous waste.

The unique design of the device 10 of the present invention allows induced ionic reactions to occur within fluids containing reactable material flowing radially, as described above, through electron fields and focused frequency treatment originating from various types of metals or conductors used to make the elements. The design creates a radial flow of the fluid such that a constant change in direction, pressure, density, speed of flow, velocity, temperature, liquid mix, turbulence, and exposure to treatment results. All of these actions are beneficial, helpful, and desirable during the treatment process described herein.

Also, this design contains no self-defeating attributes as may be found in other electrochemical or electrolytical designs. The resulting fluid turbulence achieves superior mixing and superior exposure to treatment and thus a far more efficient induced ionic reaction, and additionally, achieves self-cleaning of the electrodes and emitters and achieves a large reduction in resistant foaming. Further, the amount of energy consumed in treatment or to start the induced ionic reaction or any induced free radical reactions has been greatly reduced and thereby the temperature gain in the liquid has also been significantly reduced.

The design also allows maximum treatment area to be achieved in the reaction chamber 26 and, therefore, attains new levels of precipitation to be achieved. Thus, significant increases in levels of contaminant reduction after proper filtration over other designs are realized.

EXAMPLES

Two examples are given below in Table I of laboratory scale treatment runs using the device 10 of the present invention. Actual plant wastewater from a chromate conversion process was treated. One example is treatment of chromium contamination which was the primary problem and the target substance for the reaction chamber setup. The other example is for treatment of total dissolved solids in the wastewater.

TABLE I

| Test | Before Treatment | After Treatment | Units |
| --- | --- | --- | --- |
| Total Dissolved Solids | 215.0 | 120.0 | mg/l |
| Chromium (total) | 22.0 | 0.52 | mg/l |

Comparison of "before treatment" levels with "after treatment" levels of Total Dissolved Solids and Chromium shows substantial reductions for both after one pass through the device 10, and especially for Chromium which was the target substance in a normally treatment-resistive water.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An induced ionic reaction device, comprising:
   (a) an elongated hollow transport tube having an elongated chamber with a longitudinal axial and an inlet and outlet in opposite end portions of said transport tube for entry of fluid to be treated into said chamber of said transport tube and for exit of fluid treated from said chamber of said transport tube;
   (b) means disposed in said chamber of said transport tube for defining a radial path of fluid flow through said chamber of said transport tube, said means for defining a radial path of fluid flow through said chamber of said transport tube including a plurality of disc-shaped elements stationarily disposed in said chamber of said transport tube and being spaced from one another along said longitudinal axis of said chamber of said transport tube, said disc-shaped elements and an interior surface of said hollow transport tube together defining said radial path of fluid flow through said chamber of said transport tube, said plurality of disc-shaped elements including a first group of said elements being sealed about their peripheral edges with said interior surface of the transport tube, each of said elements of said first group having a flow passage formed through substantially a central portion of said element, each of said disc-shaped elements of said first group having an exterior cylindrical shape and a pair of concave face surfaces define don opposite ends of said element; and
   (c) control means connected to said radial path defining means for imposing a predetermined electron field in said chamber of said transport tube to induce ionic reactions in the fluid flowing through said chamber of the transport tube and thereby precipitate out substances carried by the fluid into large complex molecular clumps.

2. The device of claim 1 wherein said plurality of disc-shaped elements include a second group of said elements each having a plurality of passages formed through substantially a peripheral portion of said element adjacent to said interior surface of said transport tube.

3. The device of claim 1 wherein said peripheral flow passages through each of said disc-shaped elements of said second group merge with said interior surface of said transport tube.

4. The device of claim 1 wherein said peripheral flow passages through each of said disc-shaped elements of said second group are spaced from said interior surface of said transport tube.

5. The device of claim 1 wherein said radial path of fluid flow through said chamber of said transport tube defined by said disc-shaped elements of said first and second groups have expanding and contracting path segments.

6. The device of claim 5 wherein said expanding path segments provide fluid flow directed radially outwardly from said central flow passages of said elements of said first group toward said peripheral flow passages of said elements of said second group.

7. The device of claim 6 wherein said contracting path segments interconnect said expanding path segments and provide fluid flow directed radially inwardly from said peripheral flow passages of said elements of said second group toward said central flow passages of said elements of said first group.

8. The device of claim 7 wherein said flow of fluid proceeds along said radially-outwardly directed expanding path segments at a slower speed than along said radially-inwardly directed contracting path segments.

9. The device of claim 1 wherein each of said disc-shaped elements of said first group has an exterior cylindrical shape and a pair of parallel face surfaces defined on opposite ends of said element.

10. The device of claim 1 wherein said disc-shaped elements of said second group are located in alternating relation with said disc-shaped elements of said first group.

11. An induced ionic reaction device, comprising:
 (a) an elongated hollow transport tube having an elongated chamber with a longitudinal axis and an inlet and outlet in opposite end portions of said transport tube for entry of fluid to be treated into said chamber of said transport tube and for exit of fluid treated from said chamber of said transport tube;
 (b) means disposed in said chamber of said transport tube for defining a radial path of fluid flow through said chamber of said transport hue, said means or defining a radial path of fluid flow through said chamber of said transport bue including a plurality of disc-shaped elements stationarily disposed in said chamber of said transport tube and being spaced from one another along said longitudinal axis of said chamber of said transport tube, said disc-shaped elements and an interior surface of said hollow transport tube together defining said radial path of fluid flow through said chamber of said transport tube, said plurality of disc-shaped elements including a first group of said elements being sealed about their peripheral edges with said interior surface of the transport tube, each of said elements of said first group having a flow passage formed through substantially a central portion of said element, said plurality of disc-shaped elements including a second group of said elements each having a plurality of passages formed through substantially a peripheral portion of said element adjacent to said interior surface of said transport tube; and
 (c) control means connected to said radial path defining means for imposing a predetermined electron field in said chamber of said transport tube to induce ionic reactions in the fluid flowing through said chamber of the transport tube and thereby precipitate out substances carried by the fluid into large complex molecular clumps.

12. The device of claim 11 wherein said peripheral flow passages through each of said disc-shaped elements of said second group merge with said interior surface of said transport tube.

13. The device of claim 11 wherein said peripheral flow passages through each of said disc-shaped elements of said second group are spaced from said interior surface of said transport tube.

14. The device of claim 11 wherein said disc-shaped elements of said second group are located in alternating relation with said disc-shaped elements of said first group.

15. The device of claim 11 wherein each of said disc-shaped elements of said second group has an exterior cylindrical shape and a pair of parallel face surfaces defined on opposite ends of said element.

16. The device of claim 11 wherein each of said disc-shaped elements of said second group has an exterior cylindrical shape and a pair of convex face surfaces defined on opposite ends of said element.

17. The device of claim 11 wherein said peripheral passages of each of said disc-shaped elements of said second group are defined by a plurality of grooves being spaced apart circumferentially and defined about said peripheral portion of said element.

18. The device of claim 11 wherein said radial path of fluid flow through said chamber of said transport tube defined by said disc-shaped elements of said first and second groups have expanding and contracting path segments.

19. The device of claim 18 wherein said expanding path segments provide fluid flow directed radially outwardly from said central flow passages of said elements of said first group toward said peripheral flow passages of said elements of said second group.

20. The device of claim 19 wherein said contracting path segments interconnect directed radially inwardly from said peripheral flow passages of said elements of said second group toward said central flow passages of said elements of said first group.

21. The device of claim 20 wherein said flow of fluid proceeds along said radially-outwardly directed expanding path segments at a slower speed than along said radially-inwardly directed contacting path segments.

22. An induced ionic reaction device, comprising:
 (a) an elongated hollow transport tube having an elongated chamber with a central longitudinal axis and an inlet port and an outlet port in opposite end portions of said transport tube for entry of fluid to be treated into said chamber of said transport tube and for exit of fluid treated from said chamber of said transport tube;
 (b) a plurality of center-flow and peripheral flow disc-shaped elements stationarily disposed in said chamber of said transport tube and being spaced from one another along said longitudinal axis of said chamber of said transport tube, said center-flow and peripheral-flow disc-shaped elements and an interior surface of said hollow transport tube together defining a radial path of fluid flow through said chamber of said transport tube, each of said center-flow disc-shaped elements having an exterior cylindrical shape and a pair of parallel face surfaces defined on opposite ends of said element; and
 (c) control mans connected to said selected ones of said center-flow and peripheral-flow disc-shaped elements for electrically charging preselected ones of said disc-shaped elements to establish said disc-shaped elements as electrical electrodes and emitters for inducing ionic reactions in the fluid flowing through said chamber of said transport tube and thereby precipitate out substances carried by the fluid into large complex molecular clumps.

23. An induced ionic reaction device, comprising:
 (a) an elongated hollow transport tube having an elongated chamber with a central longitudinal axis and an inlet port and an outlet port in opposite end portions of said transport tube for entry of fluid to be treated into said chamber of said transport tube and for exit of fluid treated from said chamber of said transport tube;
 (b) a plurality of center-flow and peripheral flow disc-shaped elements stationarily disposed in said chamber of said transport tube and being spaced from one anther along said longitudinal axis of said chamber of said transport tube, said center-flow and peripheral-flow disc-shaped elements and an interior surface of said hollow transport tube together defining a radial path of fluid flow through said chamber of said transport tube, each of said center-flow disc-shaped elements having an exterior cylindrical shape and a pair of concave face surfaces defined on opposite ends of said element; and (c) control means connected to said selected ones of said center-flow and peripheral-flow disc-shaped elements for electrically charging preselected ones of said disc-shaped elements to establish said disc-shaped elements as electrical electrodes and emitters for inducing ionic reactions in the fluid flowing through said chamber of said transport tube and thereby precipitate out substances carried by the fluid into large complex molecular clumps.

24. An induced ionic reaction device, comprising:
(a) an elongated hollow transport tube having an elongated chamber with a central longitudinal axis and an inlet port and an outlet port in opposite end portions of said transport tube for entry of fluid to be treated into said chamber of said transport tube and for exit of fluid treated from said chamber of said transport tube;
(b) a plurality of center-flow and peripheral flow disc-shaped elements stationarily disposed in said chamber of said transport tube and being spaced from one another along said longitudinal axis of said chamber of said transport tube, said center-flow and peripheral-flow disc-shaped elements nd an interior surface of said hollow transport tube together defining a radial path of fluid flow through said chamber of said transport tube, each of said peripheral-flow disc-shaped elements having a plurality of passages formed through substantially a peripheral portion of said element adjacent to said interior surface of said transport tube; and
(c) control means connected to said selected ones of said center-flow and peripheral-flow disc-shaped elements for electrically charging preselected ones of said disc-shaped elements to establish said disc-shaped elements as electrical electrodes and emitters for inducing ionic reactions in the fluid flowing through si chamber of said transport tube and thereby precipitate out substances carried by the fluid into large complex molecular clumps.

25. The device of claim 24 wherein said plurality of center-flow disc-shaped elements are sealed about their peripheral edges with said interior surface of said transport tube.

26. The device of claim 24 wherein each of said center-flow disc-shaped elements has a flow passage formed through substantially a central portion of said element.

27. The device of claim 24 wherein said peripheral flow passages through each of said peripheral-flow disc-shaped elements merge with said interior surface of said transport tube.

28. The device of claim 24 wherein said peripheral flow passages through each of said peripheral-flow disc-shaped elements are spaced from said interior surface of said transport tube.

29. The device of claim 24 wherein said peripheral flow passages of each peripheral-flow element are defined by a plurality of grooves circumferentially spaced apart and defined about said peripheral portion of said element.

30. The device of claim 24 wherein said peripheral-flow disc-shaped elements are located in alternating relation with said center-flow disc-shaped elements.

31. The device of claim 24 wherein said radial path of fluid flow through said chamber of said transport tube defined by said center-flow and peripheral-flow disc-shaped elements have expanding and contracting path segments.

32. The device of claim 31 wherein said expanding path segments provide fluid flow directed radially outwardly from said central flow openings of said center-flow disc-shaped elements toward said peripheral flow passages of said peripheral-flow disc-shaped elements.

33. The device of claim 32 wherein said contracting path segments interconnect said expanding path segments and provide fluid flow directed radially inwardly from said peripheral flow passages of said peripheral-flow disc-shaped elements toward said central flow openings of said center-flow disc-shaped elements.

34. An induced ionic reaction device, comprising:
(a) an elongated hollow transport tube having an elongated chamber with a central longitudinal axis and an inlet port and an outlet port in opposite end portions of said transport tube for entry of fluid to be treated into said chamber of said transport tube and for exit of fluid treated from said chamber of said transport tube;
(b) a plurality of center-flow and peripheral flow disc-shaped elements stationarily disposed in said chamber of said transport tube and being spaced from one another along said longitudinal axis of said chamber of said transport tube, said center-flow and peripheral-flow disc-shaped elements and an interior surface of said hollow transport tube together defining a radial path of fluid flow through said chamber of said transport tube, each of said peripheral-flow disc-shaped elements has an exterior cylindrical shape and a pair of parallel face surfaces defined on opposite ends of said element; and
(c) control means connected to said selected ones of said center-flow and peripheral-flow disc-shaped elements for electrically charging preselected ones of said disc-shaped elements to establish said disc-shaped elements as electrical electrodes and emitters for inducing ionic reactions in the fluid flowing through said chamber of said transport tube and thereby precipitate out substances carried by the fluid into large complex molecular clumps.

35. An induced ionic reaction device, comprising:
(a) an elongated hollow transport tube having an elongated chamber with a central longitudinal axis and an inlet port and an outlet port in opposite end portions of said transport tube for entry of fluid to be treated into said chamber of said transport tube and for exit of fluid treated from said chamber of said transport tube;
(b) a plurality of center-flow and peripheral flow disc-shaped elements stationarily disposed in said chamber of said transport tube and being spaced from one another along said latitudinal axis of said chamber of said transport tube, said center-flow and peripheral-flow disc-shaped elements and an interior surface of said hollow transport tube together defining a radial path of fluid flow through said chamber of said transport tube, each of said peripheral-flow disc-shaped elements of said second group has an exterior cylindrical shape and a pair of convex face surfaces defined on opposite ends of said element; and (c) control means connected to said selected ones of said center-flow and peripheral-flow disc-shaped elements for electrically charging preselected ones of said disc-shaped elements to establish said disc-shaped elements as electrical electrodes and emitters for inducing ionic reactions in the fluid flowing through said chamber of said transport tube and thereby precipitate out substances carried by the fluid into large complex molecular clumps.

* * * * *